(12) United States Patent
Park

(10) Patent No.: US 6,480,870 B1
(45) Date of Patent: Nov. 12, 2002

(54) RANDOM NUMBER GENERATOR USING LEHMER ALGORITHM

(75) Inventor: Si-Yung Park, Kyungki-Do (KR)

(73) Assignee: Hyundai Electronics Industries Co., Ltd., Ichon (KR)

( * ) Notice: Subject to any disclaimer, the term of this patent is extended or adjusted under 35 U.S.C. 154(b) by 0 days.

(21) Appl. No.: 09/369,398

(22) Filed: Aug. 6, 1999

(30) Foreign Application Priority Data

Oct. 2, 1998 (KR) .............................................. 98-41593

(51) Int. Cl.$^7$ .............................. G06F 1/02; G06F 7/00
(52) U.S. Cl. ........................................ 708/253; 708/491
(58) Field of Search ................................ 708/250, 252, 708/253, 254, 255, 256, 491, 492

(56) References Cited

U.S. PATENT DOCUMENTS

| 5,317,528 A | * | 5/1994 | Gofman | ....................... 708/250 |
| 6,097,815 A | * | 8/2000 | Shimada | ....................... 380/46 |
| 6,226,660 B1 | * | 5/2001 | Kim et al. | .................... 780/250 |

OTHER PUBLICATIONS

A.P. Paplinski, et al. "Hardware Implementation of the Lehmer Random Number Generator", IEE Proc.–Compute. Digit. Tech., vol. 143, pp. 93–95, Jan. 1996.

* cited by examiner

Primary Examiner—Chuong Dinh Ngo
(74) Attorney, Agent, or Firm—Fleshner & Kim, LLP

(57) ABSTRACT

A random number generator is provided that includes a plurality of bit generators for generating a first to last (e.g., 0'th to 30th) sum bits, a carry bit conversion section that receives a plurality of final output carries from a final bit generator of the plurality of bit generators and converts the received value to a prescribed-bit (e.g., 3-bit) signal, and a random number generation section adding the prescribed-bit signal outputted from the carry bit conversion section to the plurality of sum bits generated from the bit generation section to generate a random number. The random number generator is generated, for example, by adding a final output carry to a final sum generated from respective 31 bit generators to prevent wrap-around application of output carries of the final (e.g., 30th) a first bit generator to a 0'th bit generator.

14 Claims, 9 Drawing Sheets

FIG. 7

|  | CONVENTIONAL ART | FIRST EMBODIMENT | SECOND EMBODIMENT |
|---|---|---|---|
| TIME TAKEN TO OBTAIN ONE RANDOM NUMBER | 417.3 ns | 252.3 ns | 257.4 ns |
| USED HARDWARE |  | 79.80% | 73.70% |

RANDOM NUMBER GENERATOR USING LEHMER ALGORITHM

BACKGROUND OF THE INVENTION

1. Field of the Invention

The present invention relates to a random number generator.

2. Background of the Related Art

In general, a multiplicative linear congruential pseudo-random number generator is often employed for software routines. A random number represents a number selected from a number set where the same probability is assigned to all the numbers in the number set.

The random number generated by a computer using a big cycle is called a pseudorandom number. Such a random number generator for generating pseudo random numbers is applicable to a variety of fields including computer programming, simulation and network routing. Among them, the multiplicative linear congruential pseudorandom number generator is most widely employed.

Based on the thesis "Hardware implementation of the Lehmer random number generator" (IEE Proc.-Compute. Digit. Tech., Vol. 143, p93–95, January 1996) disclosed by A. P. Paplinski and N. Bhattacharjee, the principle of the Lehmer random number generator and a conventional hardware implementation will now be described. A Lehmer generator is a method where a random number generator is implemented in software, and the principle of the Lehmer generator is as follows.

First, a integer pseudorandom number row of $z^{(1)}, z^{(2)}, z^{(3)}, \ldots$ is generated as Equation 1:

$$z^{(n-1)} = f(z^{(n)}), n=1, 2, 3, \ldots \quad (1).$$

In Equation 1, a generation function $F(\cdot)$ is defined as follows in Equation 2:

$$r = f(z) = a \cdot z \bmod M, \; z \in 1, 2, \ldots M-1 \quad (2).$$

At this time, for the Lehmer generator, Mersenne prime $M=2^{31}-1$, and $a=7^5=16807$ are satisfied. That is, a 15-bit binary system satisfies $a_{14:0}=\{100000110100111\}$, and a random number $z^{(z)}$ is an integer implemented in 31 bits.

Using a binary digit multiplication mod M as shown in Equation 2, a parallelized version of algorithm is considered to generate a previous random number z to a subsequent random number r.

To explain a hardware implementation of such a number algorithm, it is convenient to distinguish a number from its corresponding binary system. If a is an integer, a's (n+1)-bit binary representation may be expressed in $a_{n:0}$. If a matrix is applied, a can be implemented using a scalar product of $a_{n:0}$ and 2's weight $W_{n:0}$ vector as follows in Equation 3:

$$a = a_{n:0} \cdot W_{n:0} = \sum_{i=0}^{n} a_i \cdot 2^n. \quad (3)$$

In Equation 3, $a_{n:0}=\{a_n \, a_{n-1} \ldots a_1 \, a_0\}$ denotes a numeral Equation of $a\{a \in \{0,1\}\}$, and $W_{n:0}=\{2^n \, 2^{n-1} \ldots 2^1 \, 2^0\}$ denotes a vector of binary digit weight.

Using Equation 3, a number multiplication can be expressed in a Silvester resultant matrix by a matrix product of a multiplier and a multiplicand thereof. If an m-bit multiplicand is $Z_{m-1:0}=\{Z_{m-1} \, Z_{m-2} \ldots Z_1 \, Z_0\}$, the product of the two numbers a and z may be expressed in a binary matrix as follows in Equation 4:

$$a \cdot z = a_{n:0} \cdot (z)_n \cdot w_{n+m-1:0} \quad (4).$$

In Equation 4, $(z)_n$ is a (n+1)×(n+m) Silvester resultant matrix (i.e., a convolution matrix), and it is formed from a shifted number $Z_{m-1:0}$ as follows in Equation 5:

$$(z)_n = \begin{bmatrix} z_{m-1} & z_{m-2} & \cdots & z_0 & & & \\ & z_{m-1} & z_{m-2} & \cdots & z_0 & 0 & \\ & 0 & \cdots & \cdots & & & \\ & & & z_{m-1} & z_{m-2} & \cdots & z_0 \end{bmatrix} n+1. \quad (5)$$

$$\underleftarrow{\phantom{xx}n+m\phantom{xx}}\underrightarrow{}$$

In Equation 5, the large parenthesis is used to represent the resultant matrix and the zero values form an appropriate triangle.

In the Lehmer generator, m=31, n=14 so that the number $a_{14:0}$ is a magnitude of 1×15, in Equation 4. The magnitude of the resultant matrix $(z)n$ is 15×45 and consequently the product of a and z is expressed in 1×45 number.

Generally, Equation 4 can be considered as a parallelized Equation of a product of two numbers. The respective rows of the above resultant Equation represents a shifted number $Z_{m-1:0}$ multiplied by respective digits of a multiplier, and the respective columns of the resultant Equation 5 are added up to provide a pseudorandom number result.

The subsequent step of the algorithm determines a residue obtained after dividing $a \cdot z$ by $M=2^{31}-1$. In other words, a mod M operation is carried out. To expand the above product as shown in Equation 6, the resultant matrix is divided into two dependant matrixes: C with a magnitude of (n+1)×n in the left; and D with a magnitude of (n+1)×m in the right of Equation 7. Here, q denotes quotient and r denotes residue.

$$a \cdot z = qM + r \quad (6)$$

$$(z)_n = \begin{bmatrix} z_{m-1} & \cdots & z_{m-n} & | & z_{m-n-1} & \cdots & z_0 & & \\ 0 & & \cdots & | & z_{m-n-2} & \cdots & z_1 & z_0 & 0 \\ \vdots & \cdots & z_{m-1} & | & \vdots & & & \cdots & \cdots & \cdots \\ 0 & \cdots & 0 & | & z_{m-1} & \cdots & & \cdots & z_1 & z_0 \end{bmatrix} \quad (7)$$

$$= [C \mid D]$$

By combining Equations 4 and 6, Equation 8 is obtained as follows:

$$a \cdot z = a_{n:0} \cdot (z)_n \cdot w_{n+m-1:0} \quad (8)$$
$$= a_{n:0} \cdot [C \; D] \cdot w_{n+m-1:0}$$
$$= a_{n:0} \cdot C \cdot w_{n-1:0} \cdot 2^m + D \cdot w_{m-1:0})$$
$$= a_{n:0} \cdot C \cdot w_{n-1:0} \cdot 2^m - C \cdot w_{n-1:0} + D \cdot w_{m-1:0} + C \cdot w_{n-1:0})$$
$$= a_{n:0} \cdot C \cdot w_{n-1:0} \cdot M + D \cdot w_{m-1:0} + C \cdot w_{n-1:0}).$$

Here, a relation of $W_{n+m-1:0}=W_{n-1:0} \cdot 2^m + W_{m-1:0}$ was used. Considering an integer q, Equation 9 is obtained as follows:

$$(q \cdot M + r) \bmod M = r \bmod M \quad (9)$$

Equation 1 may be incorporated in Equation 10.

$$r = (a \cdot z) \bmod M \qquad (10)$$

$$= a_{n:0}(D \cdot w_{m-1:0} + C \cdot w_{n-1:0}) \bmod M$$

$$= a_{n:0}(D \cdot w_{m-1:0} + [\,0 \quad C\,] \cdot w_{m-1:0}) \bmod M$$

Eventually, Equation 11 can be obtained as follows:

$$r = (a_{n:0} \cdot E \cdot w_{m-1:0}) \bmod M \qquad (11)$$

Here, E is formed of a (n+1)×m circulation convolution matrix as shown as follows in Equation 12:

$$E = D + [\,0 \quad C\,] = \begin{bmatrix} z_{m-n-1} & \cdots & z_0 & z_{m-1} & z_{m-2} & \cdots & z_{m-n} \\ z_{m-n-2} & \cdots & z_1 & z_0 & z_{m-1} & \cdots & z_{m-n+1} \\ \vdots & & \vdots & \vdots & \vdots & & \vdots \\ z_{m-2} & \cdots & z_{n-1} & z_{n-2} & z_{n-3} & \cdots & z_{m-1} \\ z_{m-1} & \cdots & z_n & z_{n-1} & z_{n-2} & \cdots & z_0 \end{bmatrix} \qquad (12)$$

At this time, considering that the multiplier a is a binary system wherein a corresponding bit for $a_{14}$, $a_8$, $a_7$, $a_5$, $a_2$, $a_1$, $a_0$ is "1", Equation 11 can be written as Equation 13 as follows:

$$r = (a_{14:0} \cdot E \cdot w_{30:0}) \bmod M. \qquad (13)$$

$$= (E_{14:} + E_{8:} + E_{7:} + E_{5:} + E_{2:} + E_{1:} + E_{0:}) \cdot w_{30:0} \bmod M$$

At this time, since $(1\ 1\ 1)_2 = (1\ 0\ 0\ -1)_2$ is satisfied, three rows from the quotient a can be replaced by +1 and −1 in an appropriate position. Therefore, the finally implemented formula can be expressed as Equation 14 as follows:

$$r = (E_{14:} + E_{8:} + E_{7:} + E_{5:} + E_{3:} - E_{0:}) \cdot w_{30:0} \bmod M \qquad (14)$$

In Equation 14, matrix for E values can be expressed as Equation 15.

$$\begin{bmatrix} E_{14:} \\ E_{8:} \\ E_{7:} \\ E_{5:} \\ E_{3:} \\ E_{0:} \end{bmatrix} = \begin{bmatrix} z_{16} & z_{15} & \cdots & z_{23} & z_{22} & z_{21} & z_{20} & z_{19} & z_{18} & z_{17} \\ z_{22} & z_{21} & \cdots & z_{29} & z_{28} & z_{27} & z_{26} & z_{25} & z_{24} & z_{23} \\ z_{23} & z_{22} & \cdots & z_{30} & z_{29} & z_{28} & z_{27} & z_{26} & z_{25} & z_{24} \\ z_{25} & z_{24} & \cdots & z_1 & z_0 & z_{30} & z_{29} & z_{28} & z_{27} & z_{26} \\ z_{27} & z_{26} & \cdots & z_3 & z_2 & z_1 & z_0 & z_{30} & z_{29} & z_{28} \\ z_{30} & z_{29} & \cdots & z_6 & z_5 & z_4 & z_3 & z_2 & z_1 & z_0 \end{bmatrix} \qquad (15)$$

Therefore, the Lehmer algorithm for generating a pseudorandom number can be solved by adding or subtracting mod M of six 31-bit values. The respective numbers are appropriately circulated present random number z.

A hardware implementation of Equation 14 will now be described in detail, using Equation 14 to describe addition and subtraction of the six 31-bit values of mod M. First, it should be understood that the mod M operation is carried out in relation to addition and subtraction of the two m-bit numbers. Assuming that the two numbers added mod M are $a_{m-1:0}$ and $b_{m-1:0}$. Further, assume that $s_{m-1:0}$ and $d_m$ are a sum outputted from the adder and an output carry, respectively, and Equation 16 can be satisfied as follows.

$$a_{m-1:0} + b_{m-1:0} = d_m 2^m + s_{m-1:0} \qquad (16)$$

Here, in order to carry out all the addition and subtraction, the output carry $d_m \in \{-1, 0, +1\}$ is satisfied. If the output carry is not "0", M is subtracted from the mod M operation result so that Equation 17 is obtained as follows:

$$(d_m 2^m + s_{m-1:0}) \bmod M = s_{m-1:0} + d_m 2^m - d_m (2^m - 1) \qquad (17)$$

Equation 18 is then obtained.

$$(a_{m-1:0} + b_{m-1:0}) \bmod M = s_{m-1:0} + d_m \qquad (18)$$

Thus, the operation of Equation 14 equals the calculation of Equation 15 in which the number of respective rows are calculated in the matrix. Here, one of six elements in the each row is subtracted and the number of the elements in the each row varies from −1 to 5.

In Equation 18, one problem lies in design of circuit to express the number in form of the output carry bit propagated in the subsequent position and the sum bits. Considering the input carry bit calculation required to complete the operation, Equation 19 is provided as follows:

$$(Z_a + Z_b + Z_c + Z_d + Z_e - Z_f + C_1 + C_2 - C_3) = 2(d_1 + d_2 - d_3 + d_4) + S_4 \qquad (19)$$

In Equation 19, $z_a$ is bits related to an i'th row of the matrix (Equation 15), and $c_i$ and $d_i$ are an input carry and an output carry, respectively. Also, $s_4$ denotes a sum bit.

The circuit implementing Equation 19 carries out information compression in proportion of 9:5. Nine input bits and five output bits denote numbers ranging from −2 to +7, respectively. Equation 19 can be converted into a set of three input elements and two output sums. Including the final carry-propagation adder, the implemented formula may be incorporated in Equation 20 as follows.

$$\Sigma 1: z_a + z_b + z_c = 2d_1 + s_1$$

$$\Sigma 2: s_1 + z_d + z_e = 2d_2 + s_2$$

$$\Sigma 3: s_2 - z_f - c_3 = -2d_3 + s_3$$

$$\Sigma 4: s_3 + c_1 + c_2 = 2d_4 s_4$$

$$\Sigma 5: s_4 + c_4 + c_5 = 2d_5 + r \qquad (20)$$

FIG. 1 illustrates a related art bit generator i for generating an i'th bit in the Lehmer generator to implement Equation 20. As shown in FIG. 1, the input signals $z_a, \ldots, z_i$ in the drawing are replaced by respective entries of i'th row in the matrix (Equation 15), and the input output signals $c_1$, $d_1$ are replaced by $c_{ij}$, $c_{ji+1}$.

As shown in FIG. 1, the bit generator of the related art Lehmer generator includes a first carry-save adder 101 receiving and adding first, second and third signals $z_{i+17}$, $z_{i+23}$, $z_{i-7}$ of an i'th column in the circulation convolution matrix (i.e, Equation 15) and generating a 1-bit sum and 1-bit output carries $C_{1,\,i+1}$. A second carry-save adder 102 receives the sum outputted from the first carry-save adder 101 and fourth and fifth signals $z_{i-5}$, $z_{i-3}$ of the i'th column, adds the three input signals, and generates a 1-bit sum and 1-bit output carries $C_{2,\,i+1}$. A carry-propagate subtractor 103 subtracts a sixth signal $z_i$ of the i'th column and input carry bits $C_{3,i}$ received from a carry-propagate subtractor (not shown) of an i−1'th bit generator from the sum outputted from the second carry-save adder 102. A third carry-save adder 104 adds the sum outputted from the carry-propagate subtractor 103 and two input carries $C_{1,i}$, $C_{2,i}$ received from the first and second carry-save adders of the i−1'th bit generator (not shown) and generates the 1-bit sum and 1-bit output carries $C_{4,i+1}$. Finally, a carry-propagate adder 105 adds the sum outputted from the third carry-save adder 104 and two input carries $C_{4,i}$, $C_{5,i}$, received from the third carry-save adder and the carry-propagate adder (not shown) of the i−1'th bit generator, and generates an i'th bit $r_i$ and output carry $C_{5,i+1}$ of the 31-bit random number.

FIG. 2 is a block diagram showing 31 related art bit generators connected in parallel in a random number generator to generate a 31-bit random number $r_{30:0}$. As shown in FIG. 2, the random number generator allows the output carry of the most significant bit generator (30) to be applied to the least significant bit generator (0) to perform the mod M operation as disclosed in Equation 18.

The operating steps of the related art random number generator will now be described. The 0th bit generator (0) to 30th bit generator (30) generate 1-bit data respectively using the same process described above. Thus, 31-bit random numbers $r_{30:0}$ are generated. The process performed by an i'th bit generator will be described as an example.

To generate the i'th bit, the i'th bit generator receives 6 entries of the i'th column in the matrix (Equation 15). First, the first carry-save adder 101 receives the first, second and third signals $Z_{i+17}$, $Z_{i-23}$, $Z_{i-7}$ of an i'th column, adds up the three input signals and generates the 1-bit sum and 1-bit output carries S, and $C_{1,\ i+1}$, respectively. The second carry-save adder 102 receives the sum outputted from the first carry-save adder 101 and fourth and fifth signals $Z_{i-5}$, $Z_{i-3}$ of the i'th column, adds the three input signals, and generates the result in the sum and the carry $C_{2,\ i+1}$. The carry-propagate subtractor 103 subtracts the sixth signal $Z_i$ of the i'th column and the input carry bits $C_{3,i}$ received from the previous bit generator (i.e., the carry-propagate subtractor (not shown) of an i−1'th bit generator) from the sum outputted from the second carry-save adder 102.

The third carry-save adder 104 adds the sum outputted from the carry-propagate subtractor 103 and two input carries $C_{1,i}$, $C_{2,i}$ received from the first and second carry-save adders (not shown) and generates the 1-bit sum and 1-bit output carry $C_{4,i+1}$. Then, the carry-propagate adder 105 adds the sum outputted from the third carry-save adder 104 and the two input carries $C_{4,i}$, $C_{5,i}$ respectively received from the third carry-save adder and the carry-propagate adder (not shown) of the i−1'th bit generator, and generates the i'th bit $r_i$ and 1-bit output carry $C_{5,i+1}$.

According to the above steps, the data is generated bit by bit from the respective bit generators (0–30) to determine the 31-bit random number $r_{30:0}$. However, the related art random number generator applies the 30th output carry to the 0'th input carry so as to generate a 0'th bit, which is then propagated and used.

As described above, the related art random number generator has various disadvantages. The related art random number generator wraps around a carry bit to the 0'th bit generator so that its operating path becomes longer and increases a processing time for generating a random number.

The above references are incorporated by reference herein where appropriate for appropriate teachings of additional or alternative details, features and/or technical background.

SUMMARY OF THE INVENTION

An object of the present invention is to provide a random number generator that substantially overcomes one or more problems caused by disadvantages in the related art.

Another object of the present invention is to provide a high speed random number generator.

Another object of the present invention is to provide a random number generator having increased efficiency.

Another object of the present invention is to provide a random number generator that implements a Lehmer random number generator in a reduced calculation time.

Another object of the present invention is to provide a random number generator that generates a random number by adding a final output carry to a final sum generated from respective bit generators without applying an output carry of a more significant bit generator to a less significant bit generator.

Another object of the present invention is to provide a random number generator that generates a pseudo random number without wrap around calculations for the least significant bit.

To achieve the above-described objects in a whole or in parts, there is provided a random number generator according to the present invention that includes a bit generation section having a plurality of bit generators for generating a plurality of sum bits of a prescribed-bit number, a carry bit conversion section receiving a plurality of final output carries from a final bit generator of the plurality of bit generators and converting the received value to an output signal, and a random number generation section adding the output signal of the carry bit conversion section to the bits generated from the bit generation section to generate a random number.

To achieve the above-described objects in a whole or in parts, there is provided a random number generator according to the present invention that includes a bit generator circuit that receives an input value and respectively generates a first number and an output signal, a converter that receives the output signal and generates a second number and a random number generator that combines the first and second number to generate a random number.

To further achieve the above-described objects in a whole or in parts, there is provided a method of generating pseudo random numbers from an input value according to the present invention that includes receiving the input value, generating a plurality of least significant to most significant bits using a corresponding columns of a circulation convolution matrix and a plurality of bit generators, converting a first signal received from at least one bit generator of the plurality of bit generators to a second signal, combining the second signal and the plurality of bits to generate a random number, setting the input value to the random number and repeating the above steps.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 7 is a table illustrating respective functions according to the preferred embodiments of the present invention.

DETAILED DESCRIPTION OF PREFERRED EMBODIMENTS

Figure 1:
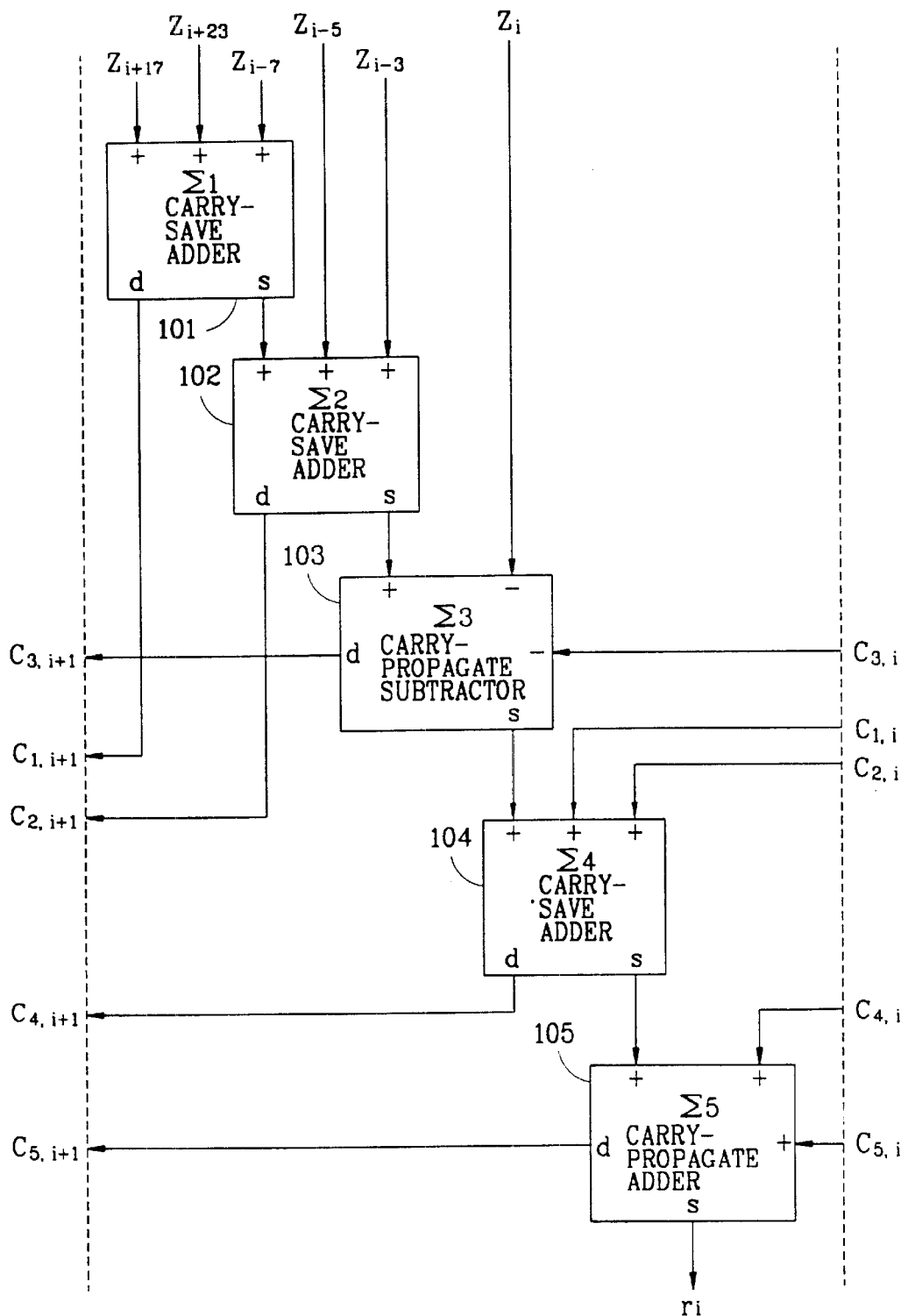
FIG. 1 is a block diagram illustrating an i'th bit generator of a related art Lehmer random number generator.
Figure 2:
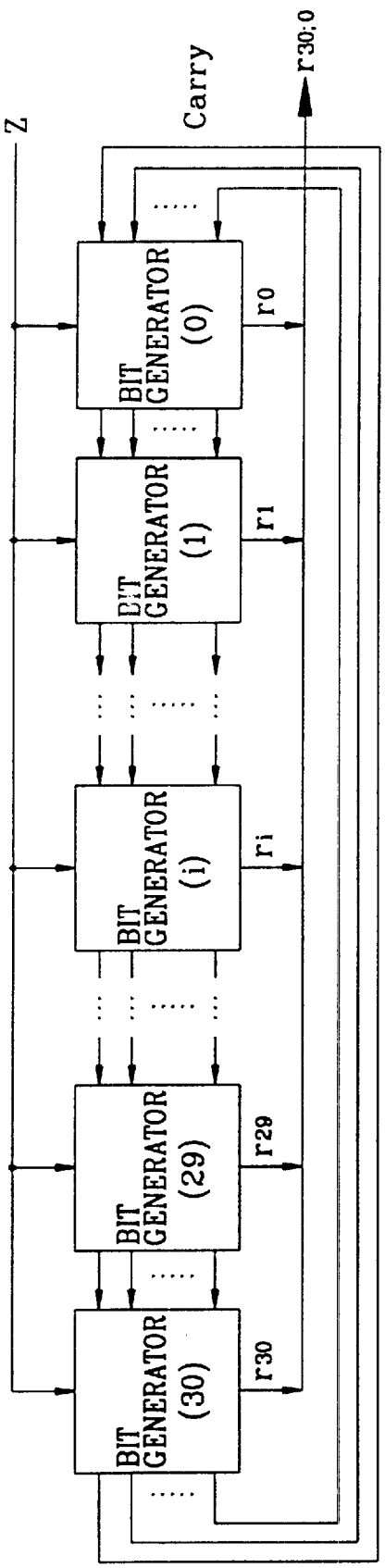
FIG. 2 is a block diagram illustrating a 31-bit related art Lehmer random number generator.
Figure 3A:
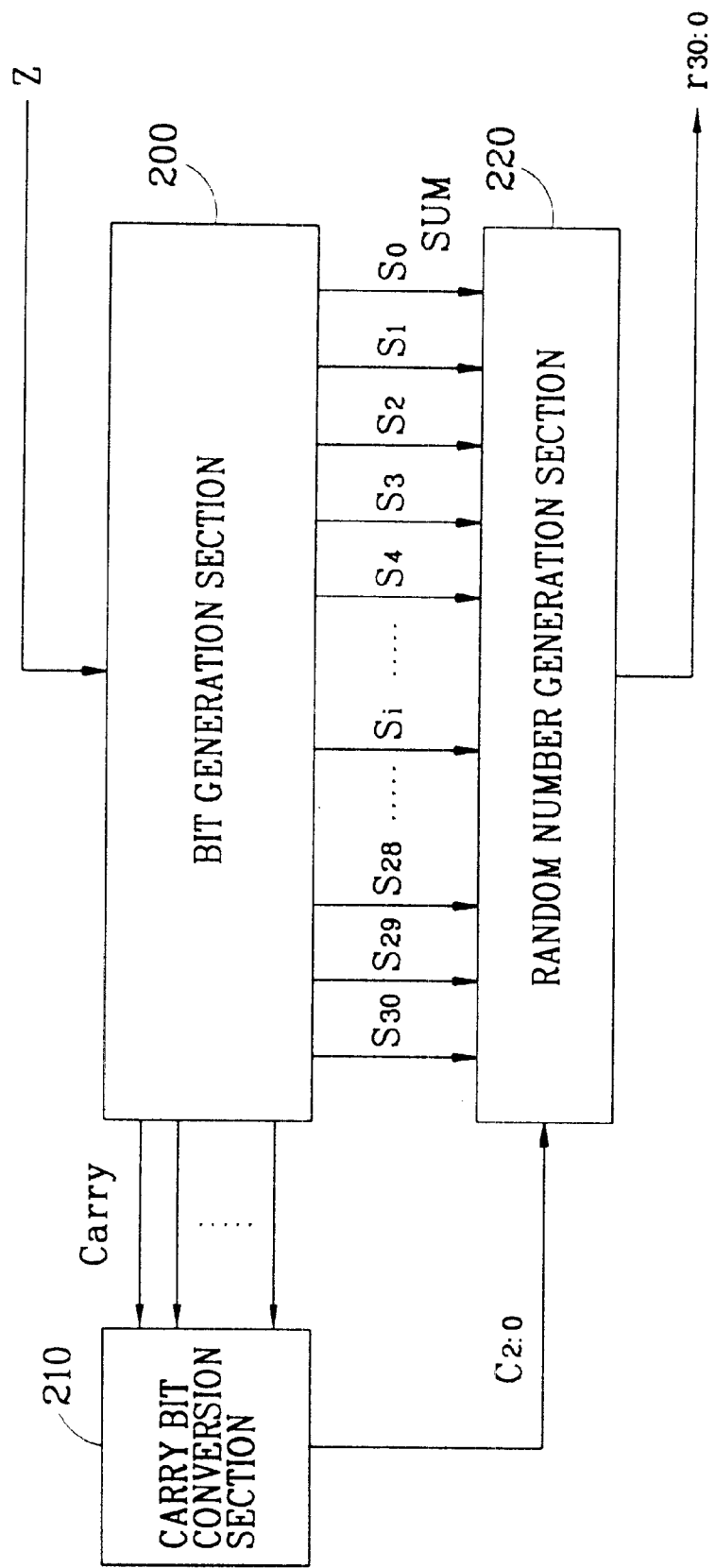
FIG. 3A is a block diagram illustrating a preferred embodiment of a random number generator according to the present invention.
Figure 4:
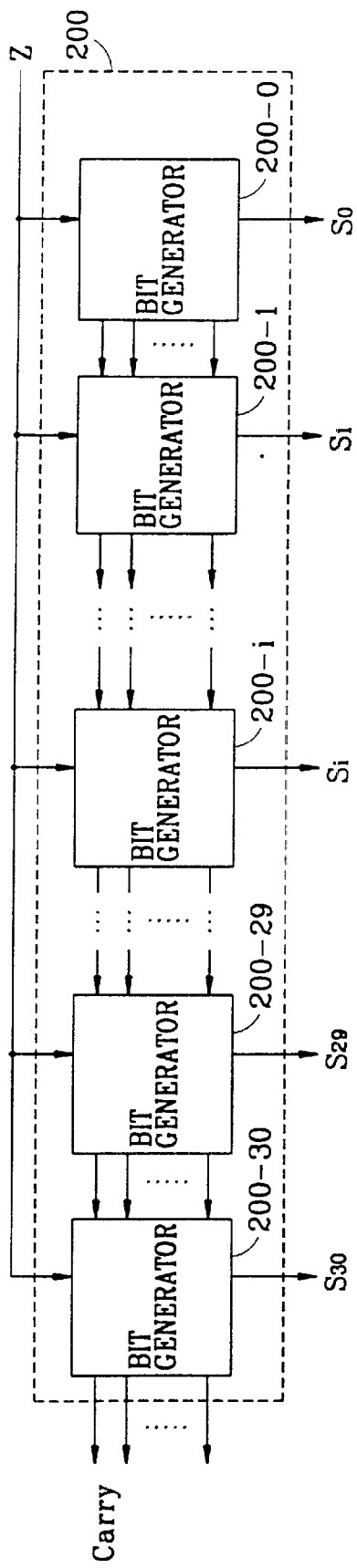
FIG. 4 is a block diagram illustrating an exemplary bit generator of FIG. 3A.

FIG. 3A is a schematic block diagram illustrating a preferred embodiment of a random number generator according to the present invention. As shown in FIG. 3A, the random number generator according to the present invention preferably includes a bit generation section 200, a carry bit conversion section 210 and a random number generation section 220. FIG. 4 is a block diagram illustrating an exemplary bit generation section 200 in the circuit of FIG. 3A. As shown in FIG. 4, the bit generation section 200 includes, for example, 31 bit generators 200-0~200-30 for generating a 0'th to a 30th sum bit, respectively. The carry bit conversion section 210 preferably receives a plurality of final output carries from the final bit generator 200-30 and preferably converts the received value to a 3-bit signal $c_{2:0}$. The random number generation section 220 preferably adds the sum bit of the 31 bits $s_0, s_1, \ldots s_{30}$ generated from the respective bit generators 200-0~200-30 and the 3-bit output carry $c_{2:0}$ outputted from the carry bit conversion section 210 and generates a 31-bit random number $r_{30:0}$.

Operations of the preferred embodiment of the random number generator according to the present invention will now be described. The preferred embodiment of the present invention uses a random number generator that generates a preferably 31-bit random number using, for example, the Lehmer algorithm. The Lehmer algorithm is described above in the description of the related art. Accordingly, a detailed description of a Lehmer random number generator will be omitted.

Figure 5:
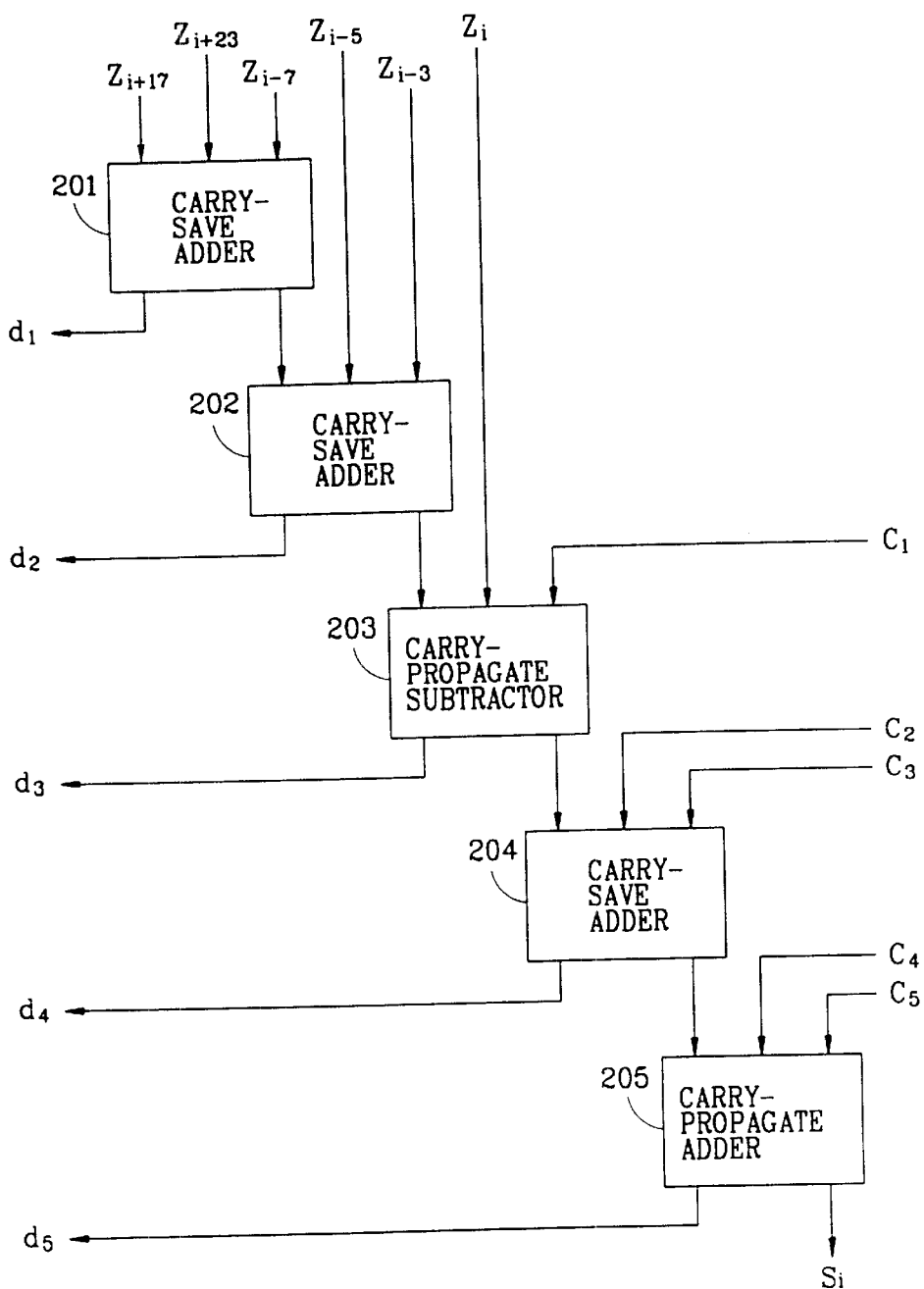
FIG. 5 is a block diagram illustrating a preferred embodiment of an i'th bit generator in FIG. 4 according to the present invention.

As shown in FIG. 4, in the preferred embodiment of the random number generator, the 31 bit generators 200-0~200-30 generate 1-bit final sum bits $s_0, s_1, \ldots, s_{30}$, respectively. However, the present invention is not intended to be so limited. A first preferred embodiment of the bit generators 200-0~200-30 according to the present invention is illustrated in FIG. 5. The first embodiment of the bit generators 200-0~200-30 as shown in FIG. 5 includes three carry-save adders 201, 202, 204, one carry-propagate subtractor 203, and one carry-propagate adder 205. The first preferred embodiment has a similar construction as the related art bit generator. That is, to generate an i'th bit according to the previously described formula (Equation 14), an i'th bit generator receives 6 entries in an i'th column according to the matrix (Equation 15).

$$r = (E_{14:} + E_{8:} + E_{7:} + E_{5:} + E_{3:} - E_{0:}) \cdot w_{30:0} \bmod M \tag{14}$$

$$\begin{bmatrix} E_{14:} \\ E_{8:} \\ E_{7:} \\ E_{5:} \\ E_{3:} \\ E_{0:} \end{bmatrix} = \begin{bmatrix} z_{16} & z_{15} & \cdots & z_{23} & z_{22} & z_{21} & z_{20} & z_{19} & z_{18} & z_{17} \\ z_{22} & z_{21} & \cdots & z_{29} & z_{28} & z_{27} & z_{26} & z_{25} & z_{24} & z_{23} \\ z_{23} & z_{22} & \cdots & z_{30} & z_{29} & z_{28} & z_{27} & z_{26} & z_{25} & z_{24} \\ z_{25} & z_{24} & \cdots & z_1 & z_0 & z_{30} & z_{29} & z_{28} & z_{27} & z_{26} \\ z_{27} & z_{26} & \cdots & z_3 & z_2 & z_1 & z_0 & z_{30} & z_{29} & z_{28} \\ z_{30} & z_{29} & \cdots & z_6 & z_5 & z_4 & z_3 & z_2 & z_1 & z_0 \end{bmatrix} \tag{15}$$

As shown in FIG. 5, the i'th bit generator according to the first preferred embodiment of the bit generator includes the first carry-save adder 201 receiving and adding first, second and third signals $Z_{i-17}, Z_{i+23}, Z_{i-7}$ of an i'th column in the circulation convolution matrix (Equation 15) and generating a 1-bit sum and 1-bit output carry $d_1$. The second carry-save adder 202 receives the sum outputted from the first carry-save adder 201 and fourth and fifth signals $Z_{i-5}, Z_{i-3}$ of the i'th column, adds the three input signals, and generates a 1-bit sum and 1-bit output carry $d_2$. The carry-propagate subtractor 203 subtracts a sixth signal $Z_i$ of the i'th column and input carry bit $C_1$, which is received from a carry-propagate subtractor (not shown) of an i-1'th bit generator, from the sum outputted from the second carry-save adder 202 and generates a 1-bit sum and 1-bit output carry $d_3$. The third carry-save adder 204 adds the sum outputted from the carry-propagate subtractor 203 and two input carries $C_2, C_3$, 1 which are received from the first and second carry-save adders (not shown) of the i-1'th bit generator, and generates the 1-bit sum and 1-bit output carry $d_4$. The carry-propagate adder 205 adds the sum outputted from the is third carry-save adder 204 and two input carries $C_4, C_5$ received from the third carry-save adder and the carry-propagate adder (not shown) of the i-1'th bit generator, and generates an i'th bit $S_1$ and output carry $d_5$.

Operations of the first preferred embodiment of a bit generator of, for example, a 30th bit generator 200-30 (that is, i=30) according to the present invention will now be described. As shown in FIG. 5, to generate the 30th bit, the six entries of the 30th column are applied to the 30th bit generator in the matrix Equation 15). Initially, the first carry-save adder 201 receives the first, second and third signals $Z_{16}, Z_{22}, Z_{23}$ of the 30th column, adds up the three input signals and generates the 1-bit sum and 1-bit output carry $d_1$.

The second carry-save adder 202 receives the sum outputted from the first carry-save adder 201 and fourth and fifth signals $Z_{25}, Z_{27}$ of the 30th column, adds the three input signals, and generates the result in the sum bit and carry $d_2$. The carry-propagate subtractor 203 subtracts the sixth signal $Z_{30}$ of the 30th column and the input carry bit $C_1$ received from the previous bit generator from the sum outputted from the second carry-save adder 202. In this example, the input carry bit $C_1$ is received from the carry-propagate subtractor of a 29th bit generator (not shown). The third carry-save adder 204 adds the sum bit outputted from the carry-propagate subtractor 203 and the two input carries $C_2, C_3$ received from the first and second carry-save adders of the 29th bit generator (not shown) and generates the 1-bit sum and 1-bit output carry $d_4$.

Then, the carry-propagate adder 205 adds the sum outputted from the third carry-save adder 204 and the two input carries $C_4, C_5$ received from the third carry-save adder and the carry-propagate adder of the 29th bit generator (not shown), and generates the 30th bit $S_{30}$ and output carry $d_5$.

Using a similar process, the data is generated bit by bit from the 31 bit generators 200-0~200-30. Thus, the final sum bits $S_0, S_1, \ldots, S_{30}$ are generated.

Figure 6:
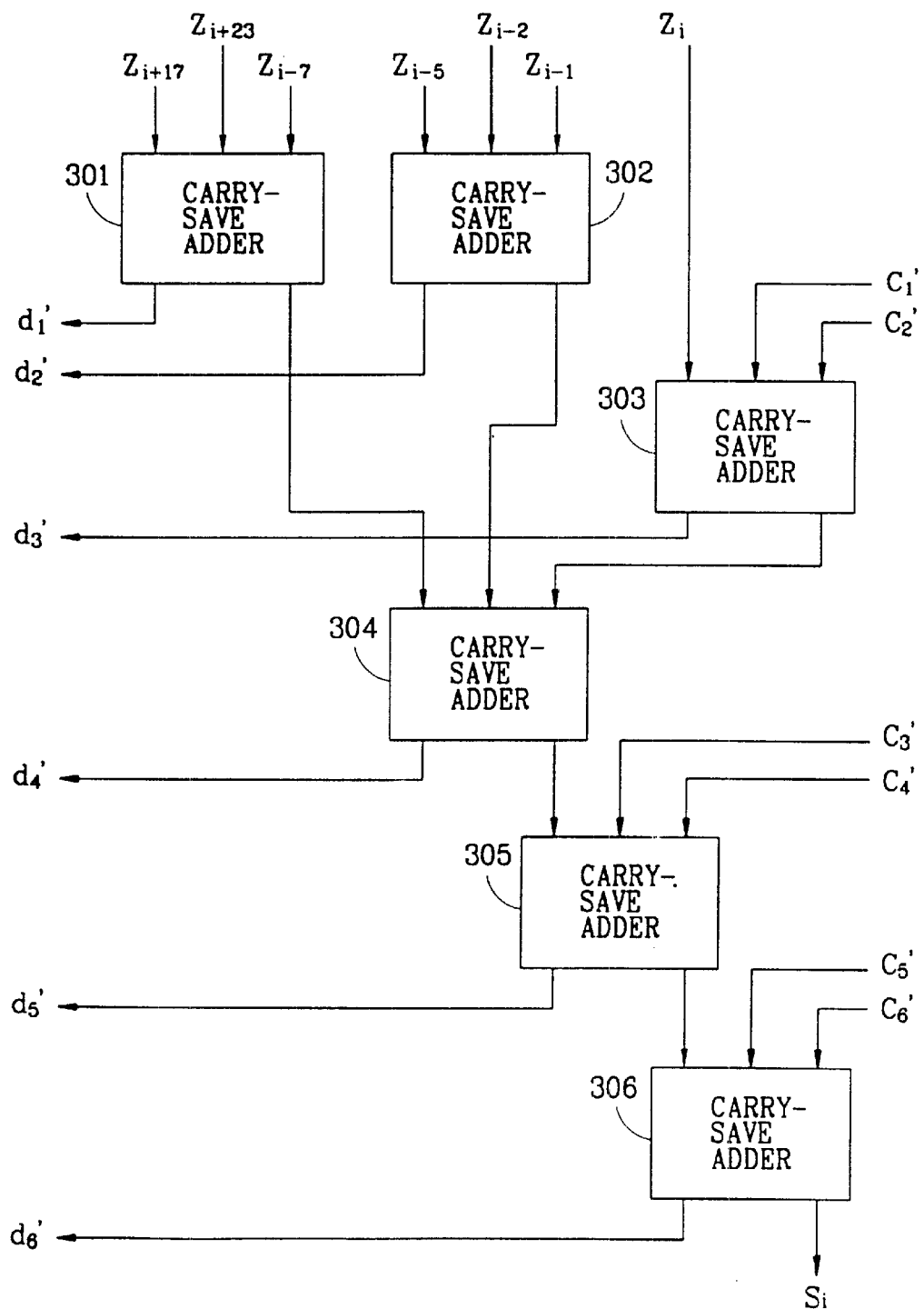
FIG. 6 is a block diagram illustrating another preferred embodiment of an i'th bit generator in FIG. 4 according to the present invention.

As shown in FIG. 6, a second preferred embodiment of a bit generator according to the present invention preferably includes six carry-save adders 301~306. In the second preferred embodiment, for example, of an i-th bit generator shown in FIG. 6 includes only adders since a subtraction operation uses more hardware than an addition operation. Thus, the first embodiment of the bit generators 200-0~200-30 shown in FIG. 5 disadvantageously requires more hardware to generate a corresponding final sum bit than the second preferred embodiment shown in FIG. 6.

To generate an i'th bit according to Equation 13 in the second preferred embodiment, seven entries are applied for the i'th column in the matrix (Equation 21).

$$r = (a_{14:0} \cdot E \cdot w_{30:0}) \bmod M \quad (13)$$
$$= (E_{14:} + E_{8:} + E_{7:} + E_{5:} + E_{2:} + E_{1:} + E_{0:}) \cdot w_{30:0} \bmod M$$

$$\begin{bmatrix} E_{14:} \\ E_{8:} \\ E_{7:} \\ E_{5:} \\ E_{2:} \\ E_{1:} \\ E_{0:} \end{bmatrix} = \begin{bmatrix} z_{16} & z_{15} & \cdots & z_{22} & z_{21} & z_{20} & z_{19} & z_{18} & z_{17} \\ z_{22} & z_{21} & \cdots & z_{28} & z_{27} & z_{26} & z_{25} & z_{24} & z_{23} \\ z_{23} & z_{22} & \cdots & z_{29} & z_{28} & z_{27} & z_{26} & z_{25} & z_{24} \\ z_{25} & z_{24} & \cdots & z_0 & z_{30} & z_{29} & z_{28} & z_{27} & z_{26} \\ z_{28} & z_{27} & \cdots & z_3 & z_2 & z_1 & z_0 & z_{30} & z_{29} \\ z_{29} & z_{28} & \cdots & z_4 & z_3 & z_2 & z_1 & z_0 & z_{30} \\ z_{30} & z_{29} & \cdots & z_5 & z_4 & z_3 & z_2 & z_1 & z_0 \end{bmatrix} \quad (21)$$

Therefore, as shown in FIG. 6, the second preferred embodiment of the i'th bit generator according to the present invention includes a first carry-save adder 301 preferably receiving and adding first, second and third signals $Z_{i+17}$, $Z_{i+23}$, $Z_{i-7}$ of an i'th column in the circulation convolution matrix (Equation 21) and generating a 1-bit sum and 1-bit output carry $d_i'$. A second carry-save adder 302 preferably receives and adds the fourth, fifth and sixth signals $Z_{i-5}$, $Z_{i-2}$, $Z_{i-1}$ of the i'th column to generate the 1-bit sum and 1-bit output carry $d_2'$. A third carry-save adder 303 adds a seventh signal $Z_i$ of the i'th column and the input carry bits $c_1'$, $c_2'$ received from the first and second carry-save adders (not shown) of the i'th-1 bit generator to generate the 1-bit sum and 1-bit output carry $d_3^1$. A fourth carry-save adder 304 adds the sum bits outputted from the first, second and third carry-save adders 301, 302, 303 to generate the 1-bit sum and the 1-bit output carry $d_4'$. A fifth carry-save adder 305 adds the sum outputted from the fourth carry-save adder 304 and two input carries $C_3'$, $C_4'$ received from the third and fourth carry-save adders (not shown) of the i-1'th bit generator and generates the 1-bit sum and 1-bit output carry $d_5'$. A sixth carry-save adder 306 adds the sum outputted from the fifth carry-save adder 305 and the two input carries $C_5'$, $C_6'$ received from the fifth and sixth carry-save adders (not shown) of the i-1'th bit generator, and generates the final sum bit $S_i$ and 1-bit output carry $d_6'$.

Operations of the bit generator according to the second preferred embodiment, for example, a 0'th bit generator 200-0 will now be described. To generate the 0'th bit, the seven corresponding entries of the 0'th column are applied to the 0'th bit generator in the matrix (21). Initially, the first carry-save adder 301 receives the first, second and third signals $Z_{17}$, $Z_{23}$, $Z_{24}$ of the 0'th column, adds up the three input signals and generates the 1-bit sum and 1-bit output carry $d_1'$. The second carry-save adder 302 receives the fourth, fifth and sixth signals $Z_{26}$, $Z_{29}$, $Z_{30}$ of the 0'th column, adds the three signals and generates the 1-bit sum and 1-bit output carry $d_2'$ of the second carry-save adder 302.

The third carry-save adder 303 adds a seventh signal $Z_0$ of the 0'th column and two input carry bits $C_1'$, $C_2'$, and the result is generated in the 1-bit sum and 1-bit output carry $d_3'$. At this time, the input carry of the 0'th bit generator 200-0 is set to "0". The fourth carry-save adder 304 adds the three sum bits outputted from the first, second and third carry-save adders 301, 302, 303 and generates the 1-bit sum and the 1-bit output carry $d_4'$. The fifth carry-save adder 305 adds the sum outputted from the fourth carry-save adder 304 and the two input carries $C_3'$, $C_4'$, and generates the 1-bit sum and 1-bit output carry $d_5'$.

The sixth carry-save adder 306 adds the sum outputted from the fifth carry-save adder 305 and the two input carries $C_5'$, $C_6'$, and generates the 0'th final sum bit $S_0$ and 1-bit output carry $d_6'$. Similarly, the data is preferably generated bit by bit from each of the 31 bit generators 200-0~200-30 as shown in FIG. 6, to generate the final sum bits $S_0, S_1, \ldots, S_{30}$.

Figure 3B:
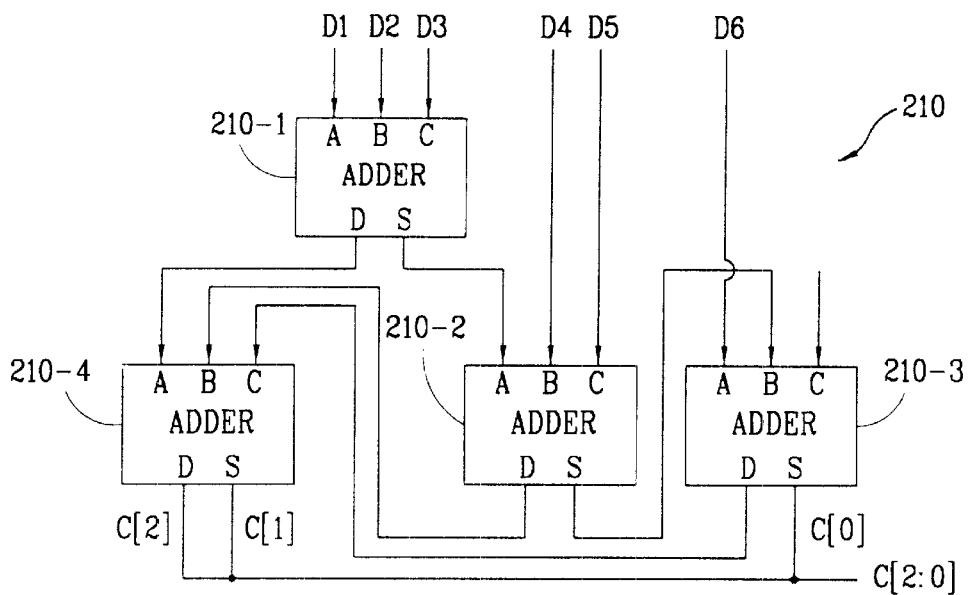
FIG. 3B is a block diagram illustrating a preferred embodiment of a carry bit conversion according to the present invention.

A first preferred embodiment of the carry bit conversion section 210 according to the present invention is illustrated in FIG. 3B. The first embodiment of the carry bit conversion section 210 as shown in FIG. 3B includes four adders 210-1, 210-2, 210-3, 210-4. The first preferred embodiment of the carry bit conversion section 210 of FIG. 3B preferably operates with the bit generation section 200 as shown in FIG. 6 and receives six output carries, for example, generated from a final bit generator 200-30 and generates a 3-bit binary signal $C_{2:0}$.

As shown in FIG. 3B, the first preferred embodiment of the carry bit conversion section 210 includes the adder 210-1 receiving and adding first, second and third output carry signals D1, D2, D3 of a 30'th bit generator 200-30 of the bit generation section 200 and generating a 1-bit sum S and 1-bit output carry D. The adder 210-2 receives the sum outputted from the adder 210-1 and fourth and fifth carry signals D4, D5 of the 30'th bit generator 200-30, adds the three input signals, and generates a 1-bit sum S and 1-bit output carry D. The adder 210-3 receives the sum outputted from the adder 210-2, a sixth carry signal D6 of the 30'th bit generator 200-30 and an input carry signal, adds the three input signals, and generates a 1-bit sum S and 1-bit output carry D. The adder 210-4 receives the 1-bit output carry outputted from the adders 210-1, 210-2, 210-3, adds the three input signals, and generates a 1-bit sum S and 1-bit output carry D. The 1-bit sum S and 1-bit output carry D of the adder 210-4 and the 1-bit sum S of the adder 210-3 are preferably the 3-bit binary signal $C_{2:0}$.

Figure 3C:
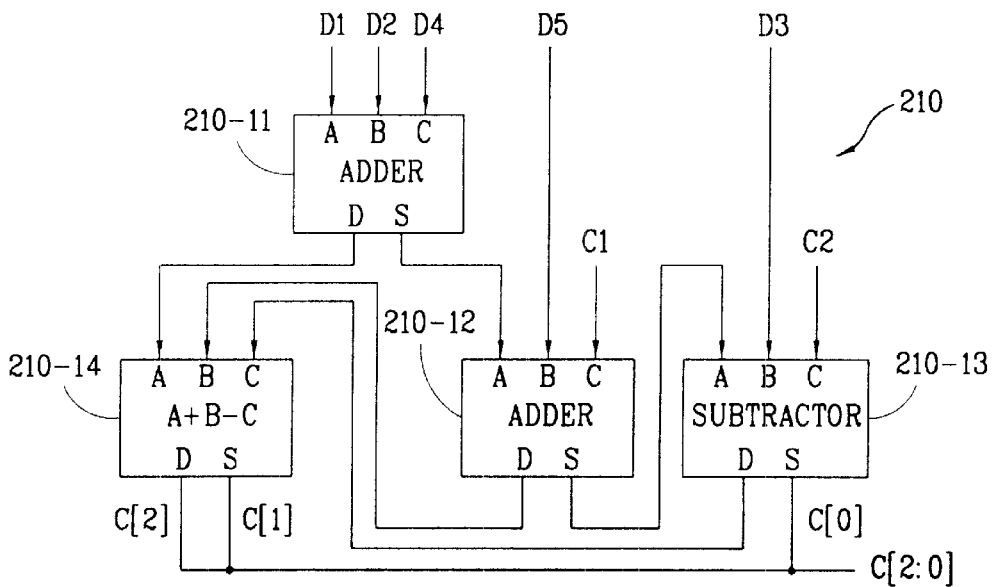
FIG. 3C is a block diagram illustrating another preferred embodiment of a carry bit conversion according to the present invention.

A second preferred embodiment of the carry bit conversion section 210 according to the present invention is illustrated in FIG. 3C. The second embodiment of the carry bit conversion section 210 as shown in FIG. 3C includes two adders 210-11, 210-12 and two subtractors 210-13, 210-14. The second preferred embodiment of the carry bit conversion section 210 of FIG. 3C preferably operates with the bit generation section 200 as shown in FIG. 5 and receives five output carries, for example, generated from a final bit generator 200-30 and generates the 3-bit binary signal $C_{2:0}$.

Figure 3D:
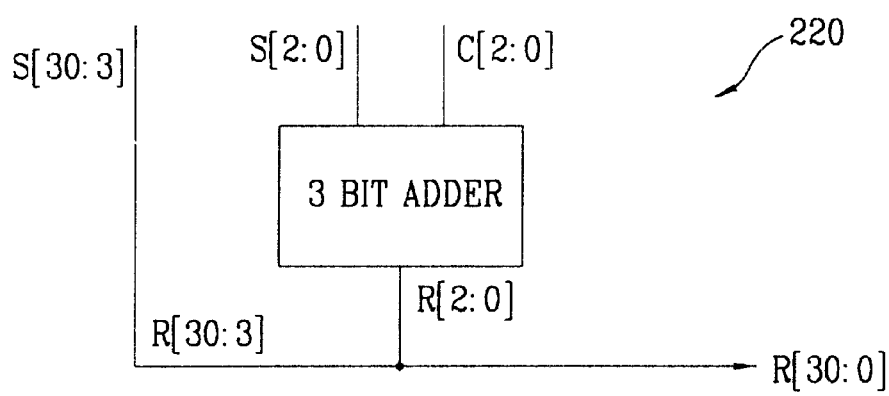
FIG. 3D is a block diagram illustrating an exemplary random number generation section of FIG. 3A.

As shown in FIG. 3C, the second preferred embodiment of the carry bit conversion section 210 includes the adder 210-11 receiving and adding first, second and fourth output carry signals D1, D2, D4 of a 30'th bit generator 200-30 of the bit generation section 200 and generating a 1-bit sum S and 1-bit output carry D. The adder 210-12 receives the sum outputted from the adder 210-11, a fifth carry signal D5 of the 30'th bit generator 200-30, and a first input carry C1, adds the three input signals, and generates a 1-bit sum S and 1-bit output carry D. The subtractor 210-13 receives the sum outputted from the adder 210-12, a third carry signal D4 of the 30'th bit generator 200-30 and a second input carry signal C2, and generates a 1-bit sum S and 1-bit output carry D. The subtractor 210-14 receives the 1-bit output carry outputted from the adders 210-11, 210-12 and the subtractor 210-13, subtracts the 1-bit carry from the subtractor 210-13 from the 1-bit output carry from the adders 210-11, 210-12, and generates a 1-bit sum S and 1-bit output carry D. Preferably, the 1-bit sum S and 1-bit output carry D of the subtractor 210-14 and the 1-bit sum S of the subtractor 210-13 are the 3-bit binary signal $C_{2:0}$, respectively. FIG. 3D is a block diagram illustrating an exemplary random number generation section of FIG. 3A.

As shown in FIG. 4, one difference of the preferred embodiments of the present invention from the related art is that the plurality of output carries are not reapplied to the 0'th bit generator. For example, the five carries $d_1$, ~$d_5$ in the first preferred embodiment of the bit generator, and the six carries $d_1'$, ~$d_6'$ in the second preferred embodiment of the bit generator are not reapplied for the least significant bit. That is, carries from the 30th bit generator 200-30 are not reapplied to the 0'th bit generator 200-0.

The carry bit conversion section 210 as shown in FIG. 3A confines the output carry generated from the final bit generator 200-30 of the bit generation section 200 not to exceed its preferred maximum value 6 so that the output carry is converted to a 3-bit binary signal $C_{2:0}$ and outputted accordingly. Then, the random number generation section 220 adds the final 31 sum bits $S_0, S_1, \ldots, S_{30}$ outputted from the respective bit generators 200-0~200-30 of the bit generation section 200 and the 3-bit carry bits $C_{2:0}$ to generate the 31-bit random number $r_{30:0}$. As shown in FIG. 3D, the exemplary random number generation section 220 includes a three-bit adder that preferably adds S[2:0] from the bit generation section 200 to C[2:0] from the carry bit conversion section 210 to generate R[2:0] of the 31-bit random number.

FIG. 7 is a table illustrating exemplary results of implementations of the first and second preferred embodiments of bit generators according to the present invention. In FIG. 7, the design of the preferred embodiements uses commercially available VHSIC Hardware Description Language (VHDL) implementing Field Programmable Gate Arrays (FPGA). As shown in FIG. 7, the preferred embodiments according to the present invention significantly decrease the time for obtaining one random number as compared to the method disclosed by Paplinski and Bhattachajee described in the related art.

In terms of a hardware implementation, the first preferred embodiment of the present invention employs 613 cells or uses 79.80%, and the second embodiment of the present invention employs 566 cells or uses 73.70% relative to 768 cells in FPGA for the related art. Further, the second preferred embodiment is 5 ns slower than the first preferred embodiment. However, when implemented in hardware, a significant decrease of time is obtained by the second preferred embodiment to realize a significant increase in function.

As described above, a random number generator according to the preferred embodiments of the present invention generates a random number by adding the final output carry generated from at least a most significant or a final bit generator and the sum bits (e.g., 31 bits) generated by respective first to final bit generators to decrease a hardware circuit path for obtaining the random number. Further, the preferred embodiments according to the present invention reduce a calculation time to generate a random number.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A random number generator, comprising:
    a plurality of bit generators that respectively generates a plurality of least significant to most significant bits;
    a converter that receives a plurality of output signals from a most significant bit generator and generates a control signal; and
    a number generator that combines the control signal of the converter and the bits generated from the bit generator circuit to generate a random number, wherein each of the plurality of output carry generators comprises,
        a first adder that receives a first, second and third signals of an i'th column in a convolution matrix, wherein the first adder adds the three signals to generate a first sum signal and a first output carry,
        a second adder that receives the first sum signal and fourth and fifth signals of the i'th column in the matrix, wherein the second adder adds the three input signals to generate a second sum signal and a second output carry,
        a subtractor that subtracts a sixth signal of the i'th column in the matrix and a first input carry from the second sum signal to generate a third sum signal and a third output carry,
        a third adder that adds the third sum signal and second and third input carries to generate a fourth sum signal and a fourth output carry, and
        a fourth adder that adds the fourth sum signal outputted from the third adder and fourth and fifth input carries to generate an i'th sum digit and a fifth output carry.

2. The random number generator of claim 1, wherein the random number is a binary number having a prescribed number of bits.

3. The random number generator of claim 1, wherein the prescribed number is 31 and the control signal is three 1-bit signals.

4. The random number generator of claim 1, wherein the convolution matrix is a circulation convolution matrix determined using a Lehmer process.

5. The random number generator of claim 1, wherein the first through third adders are carry-save adders and the fourth adder is a carry propagate adder, and wherein the input carry signals are at least one of based on a preceding column of the matrix and preset.

6. The random number generator of claim 1, wherein the subtractor is a carry-propagate subtractor.

7. The random number generator of claim 1, wherein the converter comprises:
    a fifth adder that receives a first, second and fourth output signals of the most significant bit generator, wherein the fifth adder adds the three signals to generate a sixth sum signal and a sixth output carry;
    a sixth adder that receives the sixth sum signal, a fifth output signal of the most significant bit generator and a first input carry, wherein the sixth adder adds the three input signals to generate a seventh sum signal and a seventh output carry;
    a second subtractor that subtracts a second input carry from a third output signal of the most significant bit generator and the seventh sum signal to generate an eighth sum signal and an eighth output carry; and a third subtractor that subtracts the eighth output carry from the sixth and seventh output carries to generate a ninth sum signal and a ninth output carry, wherein the ninth sum signal, the ninth output carry and the eighth sum signal comprise a three-bit control signal.

8. The random number generator of claim 1, wherein the number of addresses and signals vary with the i'th column of the convolutional matrix.

9. The random number generator of claim 1, wherein the converter comprises first though fourth logic circuits that each receive a combination of first through fifth input carries of the output signal of the bit generator circuit to generate the second number.

10. A random number generator, comprising:
a bit generator circuit that receives an input value and respectively generates a first number and an output signal;
a converter that receives the output signal and generates a second number; and
a number generator that combines the first and second number to generate a substantially random number, wherein the bit generator circuit comprises a prescribed plurality of bit generators, wherein each of the bit generators outputs a sum bit and comprises a plurality of output carry generators, and wherein the plurality of output carry generators comprises:
  a first adder that adds a first, second and third signals of an i'th column in a circulation convolution matrix and generates a first sum signal and a first output carry,
  a second adder that adds a fourth, fifth and sixth signals of the i'th column in the circulation convolution matrix and generates a second sum signal and a second output carry,
  a third adder that adds a seventh signal of the i'th column in the circulation convolution matrix and first and second input carries and generates a third sum signal and a third output carry,
  a fourth adder that adds the first, second and third sum signals and generates a fourth sum signal and a fourth output carry,
  a fifth adder that adds the fourth sum signal and third and fourth input carries and generates a fifth sum signal and a fifth output carry, and
  a sixth adder that adds the fifth sum signal and fifth and sixth input carries and generates the sum bit and a sixth output carry.

11. The random number generator of claim 10, wherein the number of addresses and signals vary with the i'th column of the convolutional matrix.

12. The random number generator of claim 10, wherein the converter comprises:
first though fourth logic circuits that each receive a combination of first through fifth input carries of the output signal of the bit generator circuit to generate the second number.

13. A method of generating pseudo random numbers from an input value, comprising:
receiving the input value;
generating a plurality of least significant to most significant bits using a corresponding columns of a circulation convolution matrix and a plurality of bit generators, wherein the generating each of the plurality of least significant to most significant bits using the corresponding columns of a circulation convolution matrix and a corresponding one of the plurality of bit generators, comprises,
  first adding a first, second and third signals of an i'th column in the convolution matrix, wherein the first adding adds the three signals to generate a first sum signal and a first output carry,
  second adding the first sum signal and fourth and fifth signals of the i'th column in the matrix, wherein the second adding adds the three input signals to generate a second sum signal and a second output carry,
  subtracting a sixth signal of the i'th column in the matrix and a first input carry from the second sum signal to generate a third sum signal and a third output carry,
  third adding the third sum signal and second and third input carries to generate a fourth sum signal and a fourth output carry, and
  fourth adding the fourth sum signal outputted from the third adder and fourth and fifth input carries to generate an i'th sum digit and a fifth output carry;
converting a first signal received from at least one bit generator of the plurality of bit generators to a second signal;
combining the second signal and the plurality of bits to generate a random number;
setting the input value to the random number; and
repeating the above steps.

14. A method of generating pseudo random numbers from an input value, comprising:
receiving the input value;
generating a plurality of least significant to most significant bits using a corresponding columns of a circulation convolution matrix and a plurality of bit generators, wherein the generating each of the plurality of least significant to most significant bits using the corresponding columns of a circulation convolution matrix and a corresponding one of the plurality of bit generators comprises,
  first adding a first, second and third signals of an i'th column in a circulation convolution matrix and generates a first sum signal and a first output carry,
  second adding a fourth, fifth and sixth signals of the i'th column in the circulation convolution matrix for generating a second sum signal and a second output carry,
  third adding a seventh signal of the i'th column in the circulation convolution matrix and first and second input carries for generating a third sum signal and a third output carry,
  fourth adding the first, second and third sum signals for generating a fourth sum signal and a fourth output carry,
  fifth adding the fourth sum signal and third and fourth input carries for generating a fifth sum signal and a fifth output carry, and
  sixth adding the fifth sum signal and fifth and sixth input carries for generating the sum bit and a sixth output carry;
converting a first signal received from at least one bit generator of the plurality of bit generators to a second signal;
combining the second signal and the plurality of bits to generate a random number;
setting the input value to the random number; and
repeating the above steps.

* * * * *